United States Patent [19]
McDonald et al.

[11] Patent Number: 5,096,516
[45] Date of Patent: Mar. 17, 1992

[54] METHOD OF MAKING DUAL REUSEABLE POUCHES

[75] Inventors: Daniel P. McDonald, Arlington Heights; Donald L. Van Erden, Wildwood, both of Ill.

[73] Assignee: Zip-Pak, Incorporated, Northbrook, Ill.

[21] Appl. No.: 506,120

[22] Filed: Apr. 9, 1990

[51] Int. Cl.⁵ .............................................. B65D 33/24
[52] U.S. Cl. ........................................ 156/66; 383/61; 383/65; 493/195; 493/214; 493/224; 156/204; 156/271; 156/308.4
[58] Field of Search ............... 383/61, 63, 65; 156/66, 156/204, 209, 271, 308.4; 428/99, 223; 24/576, 587; 493/195, 214, 224

[56] References Cited
U.S. PATENT DOCUMENTS

| | | | |
|---|---|---|---|
| 3,679,511 | 7/1972 | Ausnit | 383/63 X |
| 3,685,562 | 8/1972 | Ausnit | 383/63 X |
| 3,853,671 | 12/1974 | Ausnit | 156/66 X |
| 4,528,224 | 7/1985 | Ausnit | 428/99 X |
| 4,925,316 | 5/1990 | Van Erden et al. | 383/63 X |
| 4,949,527 | 8/1990 | Boeckmann et al. | 156/66 X |

*Primary Examiner*—Michael W. Ball
*Assistant Examiner*—Mark A. Osele
*Attorney, Agent, or Firm*—Hill, Van Santen, Steadman & Simpson

[57] ABSTRACT

Dual flexible plastic pouches and a method of making the pouches where the pouches are reuseable and reclosable and have a double fastener strip arranged along the center between the pouches, the double strip is formed with a lower layer and upper pull flanges folded in from the edge of the lower layer with the pull flanges having reclosable rib and groove elements between the flanges and lower layer, an upper film web is juxtaposed over the lower web and bonded thereto over the peripheral edge to form pouches, the flanges are heat sealed to the upper web with a heat blocking thermal barrier between the flanges and lower layer of the fastener to prevent unintentional bonding.

8 Claims, 2 Drawing Sheets

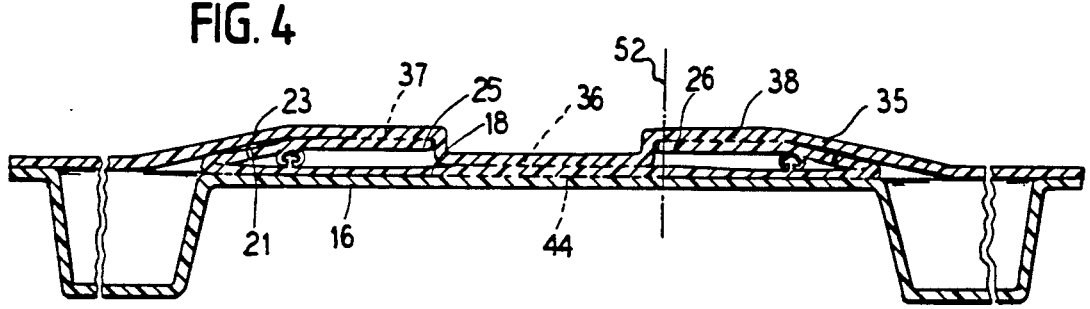
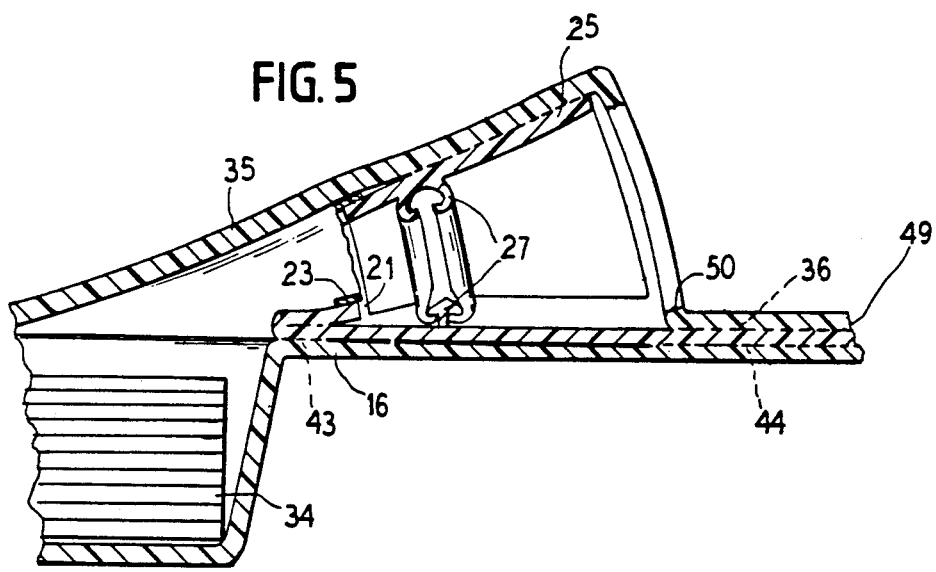
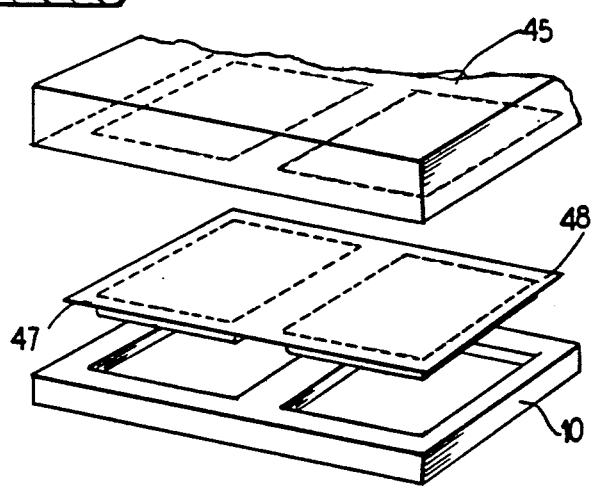

METHOD OF MAKING DUAL REUSEABLE POUCHES

BACKGROUND OF THE INVENTION

The present invention relates to improvements in plastic bags or pouches of the reuseable reopenable type and to a method of making wherein the pouches are formed as a double pouch with a double fastener strip between them.

In the manufacture of plastic bags and pouches with a plastic zipper opening such as used for foodstuffs or the like, different structures have been utilized. Such structures are illustrated in co-pending applications, Ser. Nos. 327,617, Filed Mar. 23, 1989, abandoned and continued as Ser. No. 579,284, Filed Sept. 7, 1990, now U.S. Pat. 5,002,781, Van Erden and U.S. Pat. No. 327,619, Filed Mar. 23, 1989, now U.S. Pat. No. 5,026,563, Van Erden et al. The present improvement relates to manufacture of bags of the type exemplified in the above patent applications wherein the bags are made as dual bags providing the advantages of increase in speed of manufacture and improvement of the security of attachment of the fastener strips to the bags.

In the structure of this type of bag, the bag is completely sealed against the ingress of air and moisture and seals so as to prevent the escape of liquid and greases such as often accompany foodstuffs. The bags are, however, openable by the user and resealable so as to protect the foodstuffs. The bags further have a tamper-evident feature so that the individual who purchases the bag with the product or foodstuffs from a store will visually be able to see whether access to the bag has been had previously. To accomplish these features, a unique form of structure must be employed and the present invention relates to an improved process for manufacture of that structure and further for the manufacture of the structure by producing dual bags in a single operation to thereby reduce the cost and speed the rate of manufacture.

It is an object of the present invention to provide an improved method and apparatus for the manufacture of dual bags of the type that are reopenable and have features to particularly accommodate the protection and handling of foodstuffs.

A further object of the invention is to provide an improved method and apparatus for the manufacture of dual reclosable bags wherein bonding of the layers is accomplished by heat sealing and bag and fastener areas are selectively heat bonded with means to uniquely prevent bonding in areas where the layers of film are to be left freely separable.

Other objects, advantages and features will become more apparent with the teaching of the principles of the invention in connection with the disclosure of the preferred embodiments thereof in the specification, claims and drawings in which:

DESCRIPTION OF THE DRAWINGS

FIG. 4 is a vertical sectional view with portions omitted of a dual bag structure with the view taken substantially along line IV—IV of FIG. 3;

FIG. 5 is a fragmentary sectional view illustrating the manner in which a bag formed by the method of the invention is opened; and FIG. 6 is a perspective view illustrating a final step in the formation of the dual bags, succeeding the step shown in FIG. 3.

DESCRIPTION OF THE PREFERRED EMBODIMENTS

Figure 1:
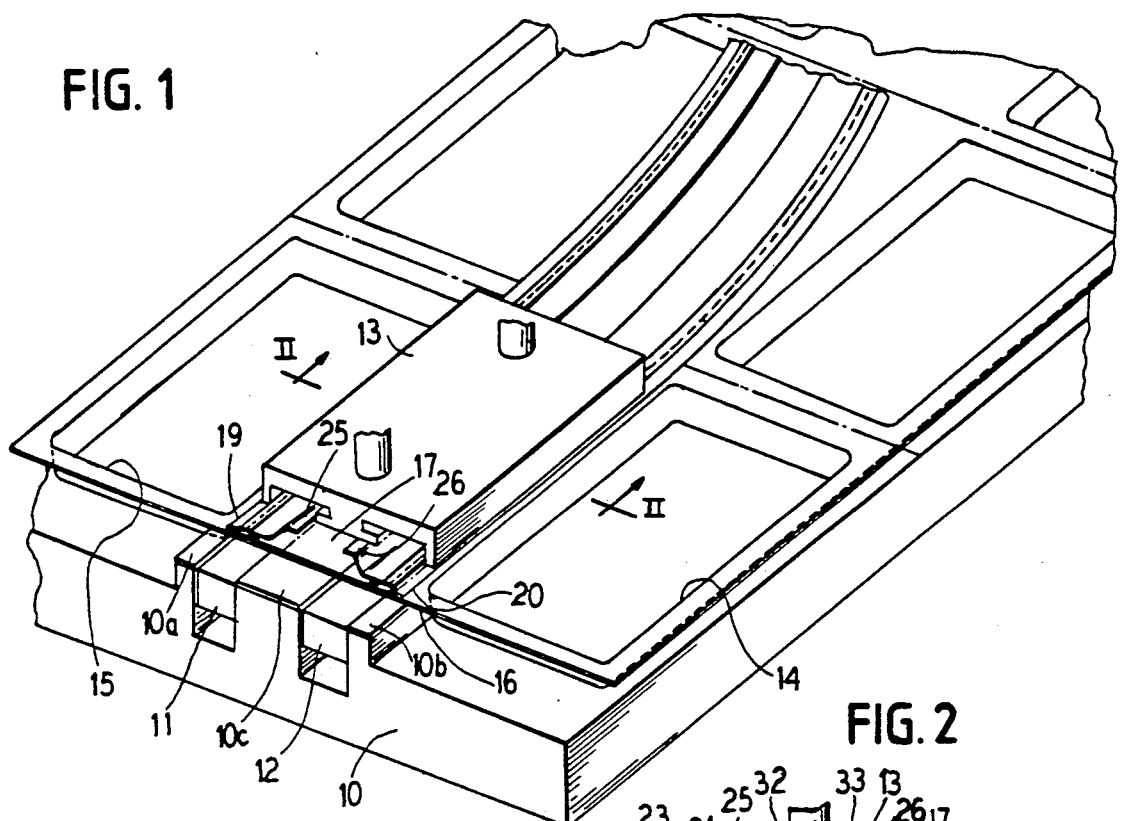
FIG. 1 is a perspective view with portions broken away of an apparatus for making dual bags constructed and operating in accordance with the principles of the present invention.
Figure 2:
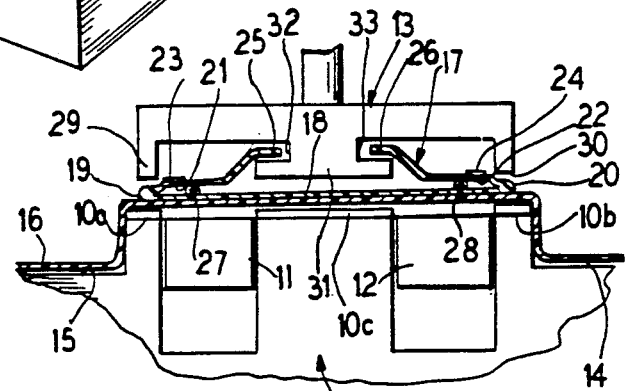
FIG. 2 is a vertical sectional view taken substantially along line II—II of FIG. 1.

As illustrated in FIGS. 1 and 2, a heated support block 10 is provided with upwardly facing pockets 14 and 15 therein for shaping a lower film web 16. The support block 10 may be flat or it may have pockets for shaping the bags or pouches to be formed. If the pouches are to be shaped, suction means may be provided in the base of the pockets or a mandrel may first push the web down into the pockets to accomplish the shape. The block 10 is heated so that the plastic will form in accordance with the shape of the pockets 14 and 15.

Extending down through the center of the block are a pair of insulating bars 11 and 12 set in grooves in the block. The insulating bars are positioned beneath fastener profiles 27 and 28 of a dual fastener strip 17 so as to prevent heat from softening or misshaping the profiles.

It will be understood that a block such as 10 may be provided with a series of pockets and a film 16 laid thereover with dual pouches being formed in series. A heated sealing block 13 is used to secure the dual fastener strip 17 thereto in a manner which will be described.

After the lower base film web 16 is laid over the block 10, the dual fastener strip 17 is laid over the center. The fastener strip 17 has a lower layer 18 and pull flange portions 25 and 26 which are folded inwardly at the doubled edge 19 and 20. Between the pull flange portions 25 and 26 on the lower layer are the interlocking fastener rib and groove profiles 27 and 28. Between the rib and groove profiles and the doubled edges 19 and 20 are lines of weakened tear resistance 21 and 22. These preferably are formed such as by perforations with a seal strip 23 and 24 over the perforations. This provides a visual tamper-evident seal for the bag. When the user buys the bag, he opens it by pulling the pull flange 25 or 26 to separate the rib and groove fasteners and tear the bag along the weakened tear lines 21 and 22. Thereafter, the bag is reclosable by reclosing the rib and the groove fasteners 27 and 28.

Turning now again to the manufacture of the bag, after the lower film web 16 has been placed in position and the doubled fastener strip 17 has been laid over the center of the lower film web, the double fastener strip is bonded to the lower web preferably by heat bonding.

The bonding takes place in three continuous bond areas which are located at the areas 10a, 10b and 10c of the heated block 10. These heated areas cause the lower layer 18 of the double fastener strip to be bonded to the lower web over its center area and along its doubled outer edges 19 and 20. The areas opposite the rib and groove fasteners 27 and 28 are protected from heat by the insulating inserts 11 and 12 so that the rib and groove fasteners are not distorted by the application of heat.

In order to press the double fastener strip 17 against the lower web 16, block 10 is pressed against a shaped shoe 13 securing the fastener strips to the web. In other words, the sealing shoe 13 provides heat while the lower form pocket block 10 moves up to provide pressure to the material for bonding.

The shoe has flanges 29 and 30 at its outer edge to press against the outer doubled edges 19 and 20 of the fastener strip. The shoe has a center face projection 31. This face projection presses the center portion of the fastener strip against the lower web to cause it to bond. The shoe projection 31 has laterally facing recesses 32 and 33 holding the free edges of the pull flanges 25 and 26 and lifting them keeping them from contacting the lower layer 18. The pull flanges are thus prevented from being unintentionally or inadvertently heat bonded to the lower layer 18.

Figure 3:
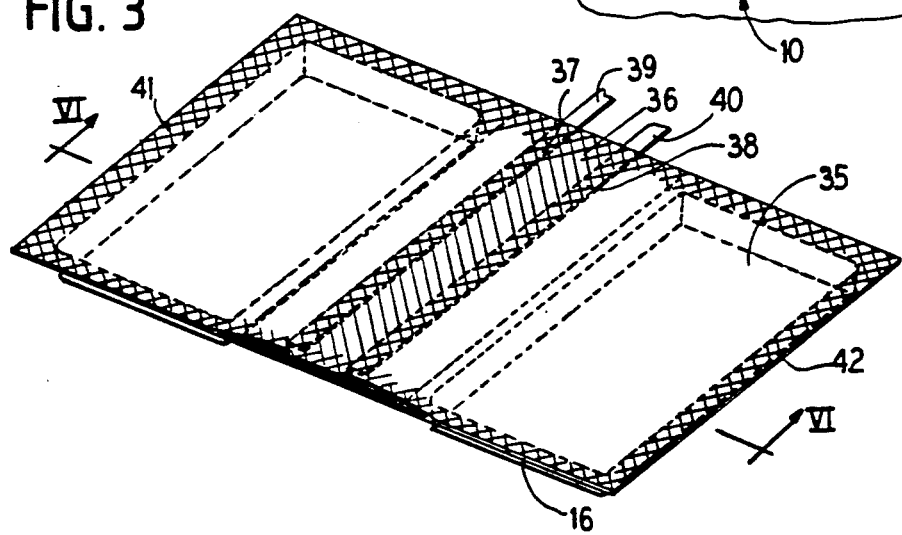
FIG. 3 is a perspective view illustrating a further step in the manufacture of dual bags.

In the next step, an upper film web 35 is laid over the lower web in juxtaposition thereover, FIG. 3. The upper web 35 is bonded over the central area 36 to the lower layer of the fastener, FIG. 4. Long anti-seal fins 39 and 40 are positioned between the pull flanges 25 and 26 and the lower layer 18 to prevent the pull flanges from being bonded to the lower layer 18. These fins may project from the trailing end of the shoe 13 and are preferably of heat insulating material so as to prevent the transfer of heat when heat is applied to the upper layer. These fins are shown in FIG. 3 and heat is applied by a platen 45, FIG. 6 to the upper layer. This platen seals the mid-portion 36 as well as the areas 37 and 38, FIG. 3, which bond the upper web 35 to the pull flanges. The platen has a shaped peripheral heat applying ridge which seals the peripheral area 41 and 42 FIG. 3 of the upper web to the lower web to complete the pouches. The completed pouches are shown in FIG. 6 at 47 and 48 lifted out of the lower plate 10. As the fins 37 and 38 are moved forwardly and withdrawn, the side seals on the bags are completed.

In operation, the lower film web 16 is laid over a heated block 10 and a doubled fastener strip 17 is laid over the center of the lower web. The lower layer 18 of the fastener strip is bonded to the lower web over the center area and over the edge areas at the doubled edges 19 and 20, FIGS. 1 and 2.

An upper film web 35 is then laid over the entire assembly, and insulating strips 39 and 40 prevent the pull flanges from being pressed down to be sealed against the lower layer 18. The pull flanges are, however, each bonded to the upper web and the upper web is bonded over its outer peripheral edge to the lower web 16. The pull flanges are prevented from being bonded to the lower layer by being held in the grooves 32 and 33, FIG. 2, while the lower fastener layer is being bonded to the lower web. The same pull flanges 25 and 26 are again prevented from being bonded to the lower layer 18 by the insulating strips 39 and 40 when the pull flanges are bonded to the upper layer 35.

FIG. 4 shows the lower layer 18 bonded to the lower web 16 and the pull flanges 25 and 26 bonded in the areas 37 and 38 to the upper web 35.

FIG. 5 illustrates the manner in which a single pouch is opened. The dual pouches are separated from each other by being cut along the center as shown at 49 in FIG. 5. The pouch will have contents such as foodstuffs 34. The upper pull flange 25 is pulled upwardly to separate at 50. More likely, the user will cut at the line 52 to free the upper pull flange 25. Then to open the package, the upper pull flange is lifted, the rib and groove fastener 27 is thus separated, and the tear line 21 is separated to open the pouch. Reclosing is accomplished by pressing the rib and groove fastener 27 back together.

While the drawings illustrate a unique arrangement for the making of dual pouches and advantages are attained in the manufacture of two pouches in one operation, both in the efficiency and in the improved structure of the pouch, features of the invention may be employed in apparatus for making a single pouch. In such arrangement, the lower block would have provisions for the formation of a single pouch and the upper shoe would have an arrangement for the construction of a single fastener for a single pouch.

Thus, it will be seen that we have provided an improved method and apparatus for making dual pouches with fastener strips. The pouches and dual fastener strips are bonded to each other in a single operation providing a pair of pouches which have unique fastener strip features that provide complete sealing in the original pouch so as to hold liquids and greases of foodstuffs within the pouch. The pouch is fully sealed around all four edges. Opening is accomplished by cutting or tearing and the pouch is reclosable to protect the foodstuffs, keeping it from drying out and being contaminated, providing a reuseable bag.

We claim as our invention:

1. The method of making dual sealed reusable pouches for foodstuffs having a dual layer folded fastener strip having a continuous one-piece lower layer and a separated upper layer folded inwardly with interlocking fastener profiles for each pouch between the lower layer and upper layer comprising the steps:

supplying a first lower foundation plastic film web of a size to form dual pouches;

applying a dual plastic fastener strip having a continuous one-piece lower layer and a separated upper layer folded inwardly to form fastener pull flanges for each of the pouches;

bonding the underside of the center of the lower layer of the fastener strip to the lower film web;

applying a second upper plastic film web in juxtaposition over the lower layer and over the strip;

and bonding an edge of the upper web to an edge of the lower web to form dual pouches and also bonding the upper web to the upper side of the strip layer along the center of the fastener strip so that dual pouches are formed separable by separating them along said center.

2. The method of making dual sealed reusable pouches for foodstuffs comprising the steps of the claim 1:

including the step of bonding the pull flange portions to the upper web.

3. The method of making dual sealed reuseable pouches for foodstuffs comprising the steps of the claim 1:

wherein said bonding is performed by applying heat to cause the plastic to heat bond.

4. The method of making dual sealed reuseable pouches for foodstuffs comprising the steps of the claim 2:

including bonding the pull flanges by heat and barring the transmittal of heat from the pull flanges to the lower film web.

5. The method of making dual sealed reuseable pouches for foodstuffs comprising the steps of the claim 2:

including applying heat to the upper web to bond the pull flanges thereto;

and positioning a thermal barrier between the flanges and the lower layer of the fastener to prevent bonding the flanges to the lower layer.

6. The method of making dual sealed reuseable pouches for foodstuffs comprising the steps of the claim 1:

wherein said bonding is performed with the application of heat to soften the plastic and bonding of all areas is performed simultaneously.

7. The method of making dual sealed reuseable pouches for foodstuffs comprising the steps of the claim 1:

wherein said bonding is performed by the application of heat and includes the step of preventing heat migration between the upper web and lower web.

8. The method of making dual sealed reusable pouches for foodstuffs having a dual layer folded fastener strip having a continuous one-piece lower layer and a separated upper layer folded inwardly with interlocking fastener profiles for each pouch between the lower layer and upper layer comprising the steps:

supplying a first lower foundation plastic film web of a size to form dual pouches;

applying a dual plastic fastener strip having flange portions folded inwardly from the edge of the strip;

bonding a lower layer of the fastener strip to the lower web;

drawing the flanges away from the lower layer of the fastener strip to prevent inadvertent bonding thereto;

applying a second upper plastic film web in juxtaposition over the lower layer and over the strip;

and bonding an edge of the upper web to an edge of the lower web to form dual pouches and also bonding the upper web to the upper side of the strip layer along the center of the fastener strip so that dual pouches are formed separable by separating them along said center.

* * * * *